(No Model.) 3 Sheets—Sheet 1.
W. H. H. FAUBER.
FENCE BUILDING MACHINE.
No. 359,778. Patented Mar. 22, 1887.
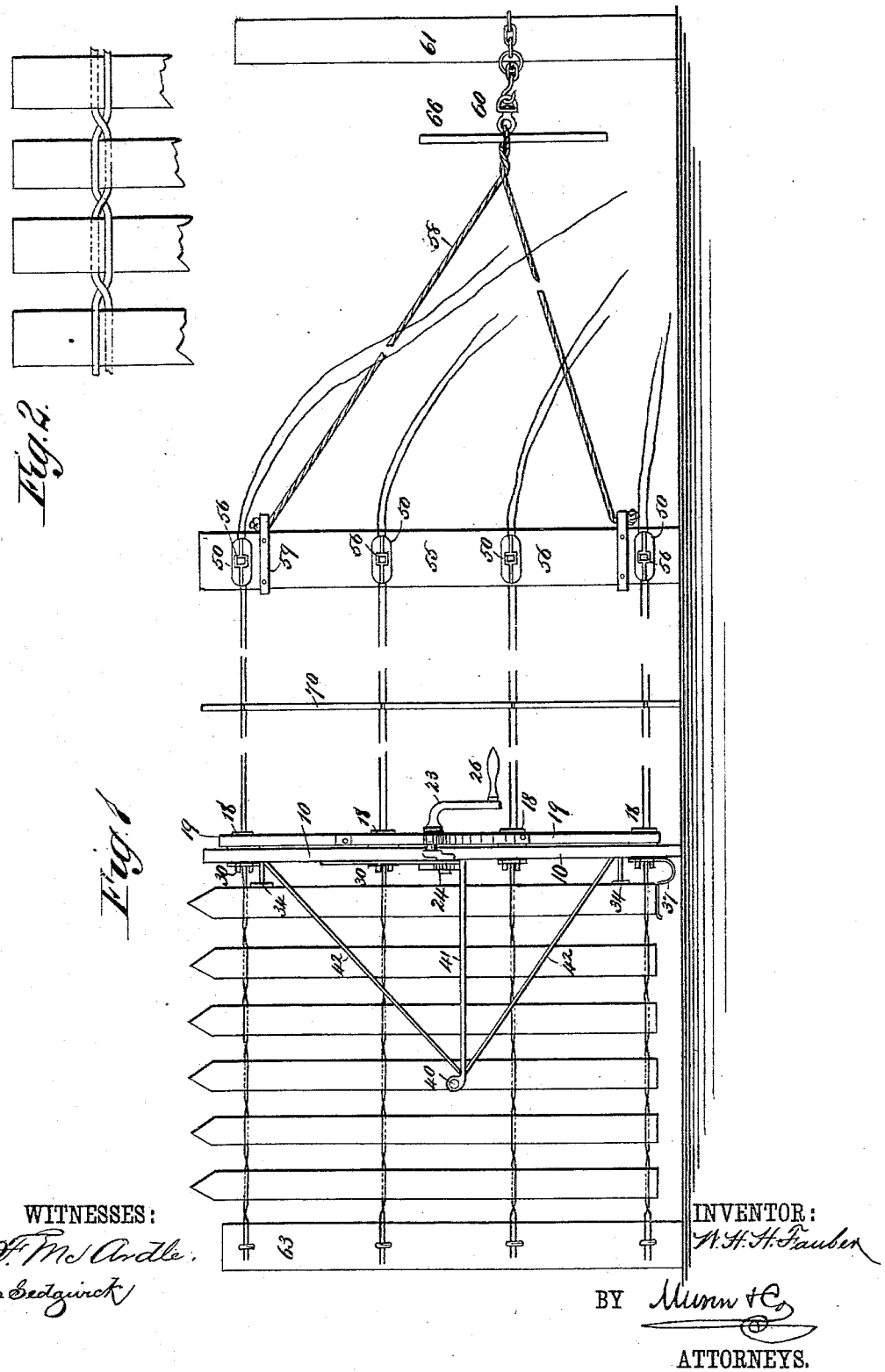
WITNESSES:
F. McArdle
C. Sedgwick
INVENTOR:
W. H. H. Fauber
BY Munn & Co
ATTORNEYS.

(No Model.) 3 Sheets—Sheet 2.

W. H. H. FAUBER.
FENCE BUILDING MACHINE.

No. 359,778. Patented Mar. 22, 1887.

WITNESSES:
F. McArdle
C. Sedgwick

INVENTOR:
W. H. H. Fauber
BY Munn & Co.
ATTORNEYS.

(No Model.) 3 Sheets—Sheet 3.
W. H. H. FAUBER.
FENCE BUILDING MACHINE.
No. 359,778. Patented Mar. 22, 1887.
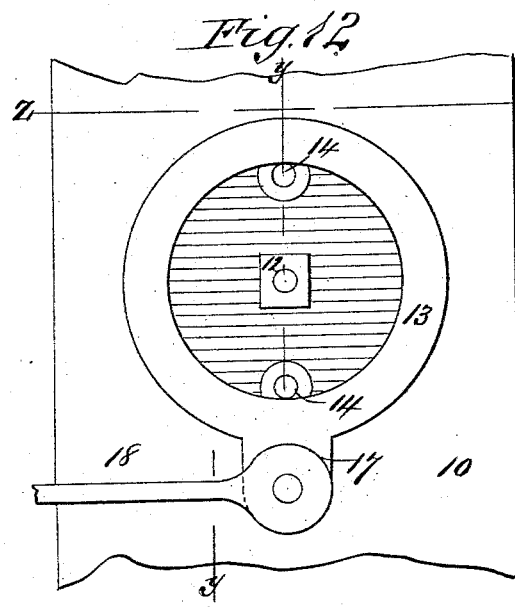
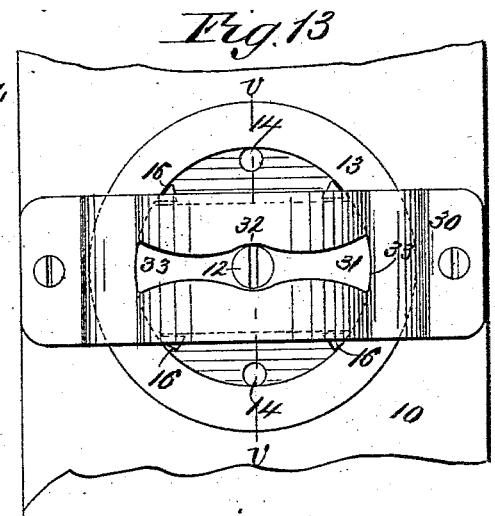
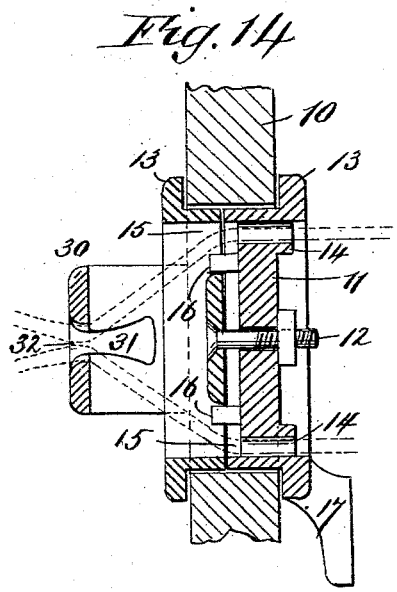
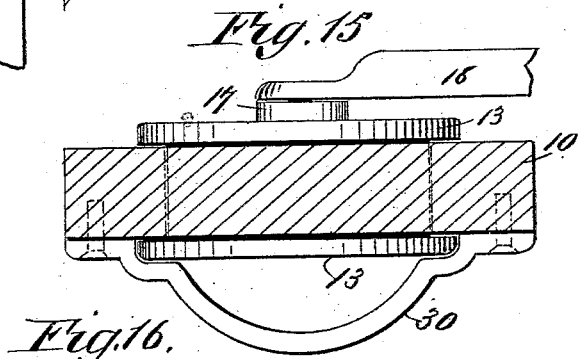
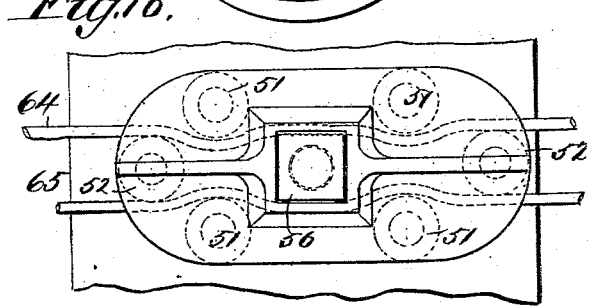
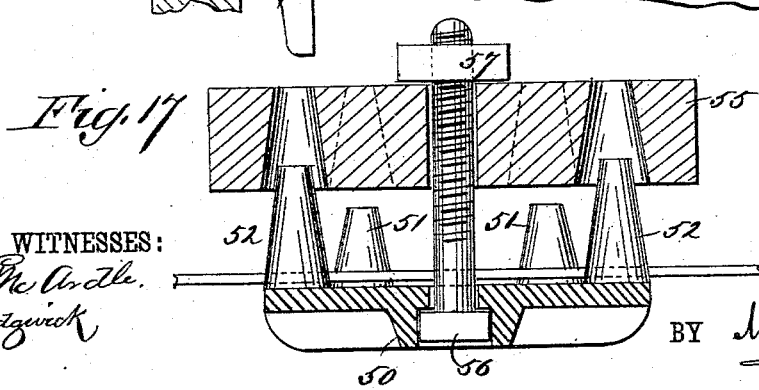
WITNESSES:
INVENTOR:
BY
ATTORNEYS.

UNITED STATES PATENT OFFICE.

W. H. HARRY FAUBER, OF MARSHFIELD, INDIANA.

FENCE-BUILDING MACHINE.

SPECIFICATION forming part of Letters Patent No. 359,778, dated March 22, 1887.

Application filed November 27, 1886. Serial No. 220,063. (No model.)

*To all whom it may concern:*

Be it known that I, W. H. HARRY FAUBER, of Marshfield, in the county of Warren and State of Indiana, have invented a new and Improved Fence-Building Machine, of which the following is a full, clear, and exact description.

My invention relates to that class of machines commonly known as "wire-fence looms" or "wire-fence-building machines," the object of the invention being to provide a light, portable, cheap, and durable hand fence-building machine, and one wherein the tension upon the wires employed to bind the pickets to place may be varied at pleasure, the said tension device being so constructed that the wires may be inserted therein without being cut.

The further objects of my invention are to provide a novel form of twisting attachment and an operating mechanism therefor, to provide the twisters with a novel wire-support, to provide for the accurate adjustment of the pickets as to height, to provide for the support of the binding-wires between the machine and the tension attachments, to provide for the proper adjustment of the tension board or strip, and finally to provide for the proper spacing and upholding of the pickets, as well as a proper alignment of the machine, all as will be hereinafter more fully described, and specifically pointed out in the claims.

Reference is to be had to the accompanying drawings, forming a part of this specification, in which similar figures of reference indicate corresponding parts in all the views.

Figure 3:
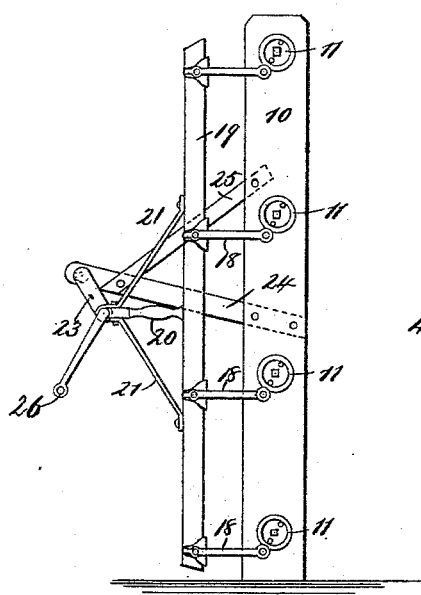
Figures 4, 5:
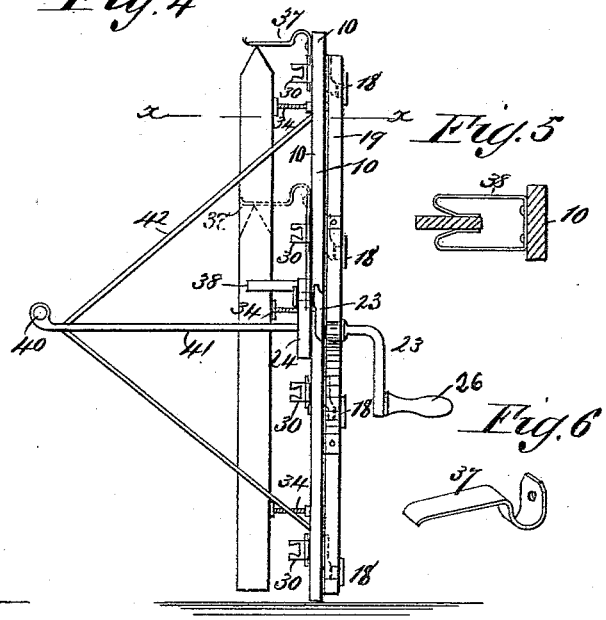
Figure 7:
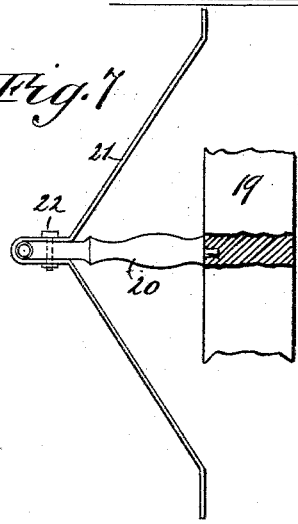
Figures 8, 9:
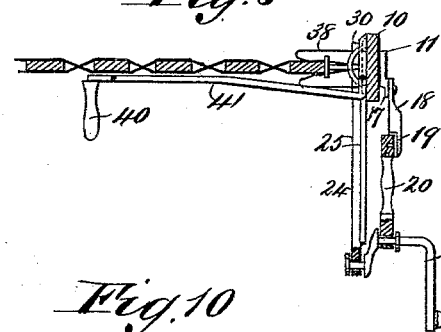
Figure 10:
Figure 11:
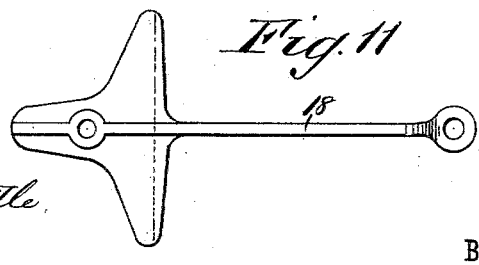

Figure 1 is a side view of my improved form of portable hand fence-building machine, the machine being represented as it appears when in use, a completed portion of the fence being shown in connection with the machine. Fig. 2 is a detail view illustrating the manner in which the wires are twisted about the slats or pickets. Fig. 3 is a view of the forward end of the machine proper. Fig. 4 is a side view of the machine proper. Fig. 5 is a view of the attachment employed to uphold the pickets when they are gaged from their tops. Fig. 6 is a perspective view of the picket gage or support. Fig. 7 is an enlarged detail view of a portion of the twist-operating mechanism. Fig. 8 is a sectional plan view taken on line *x x* of Fig. 4. Fig. 9 is a view of the strip employed to support the wire between the machine and the tension strip or bar. Fig. 10 is a detail view illustrating the arrangement of the spacing attachments. Fig. 11 is an enlarged view of one of the connections between the twisters and the twister rod or strip. Fig. 12 is a full-sized view of the face of one of the twisters. Fig. 13 is a rear view of the same. Fig. 14 is a sectional view taken on line *y y* of Fig. 12. Fig. 15 is a view taken on line *z z* of Fig. 12. Fig. 16 is a face view of one of the tension attachments, and Fig. 17 is a sectional view taken on line *v v* of Fig. 16.

In constructing such a machine as the one illustrated in the drawings above referred to, I provide a main post or block, 10, that is apertured to receive the twisters 11, said twisters being made in two parts or sections, that are united by a bolt, 12. Each of the twister-sections is formed with a flange, 13, which flanges extend beyond the apertures in the post. (See Figs. 12, 13, 14, and 15.)

The forward section of each of the twisters is formed with two apertures, 14, while the rear section of each twister is formed with two elongated slots, 15, the sections being held in rigid connection by means of the bolt 12 and by lugs 16, which are made integral with the forward section of the twisters, and extend to the rear to fit within the slots 15 of the rear sections. Each of the forward sections of the twisters is formed with a centrally-apertured lug, 17, to which there is pivotally connected one end of an arm, 18, the other end of these arms being connected to a vertical strip, 19, which carries an outwardly-extending arm, 20, that is rigidly braced by a bracing-iron, 21, which bracing-iron is secured to the end of the arm by a bolt, 22, and to the strip 19 above and below the arm, the strip 21 forming a bearing for a crank, 23, which crank is fulcrumed upon an outwardly-extending bar, 24, said bar being rigidly connected to the post 10 and properly braced by a strip, 25, the arrangement being such that as the crank 23, which is provided with a handle, 26, is turned the strip 19 will be raised or lowered, and, owing to its connection with the twisters, will necessarily move in a line parallel with the post 10, in which the said twisters partially rotate.

In connection with each of the twisters I arrange a wire-guiding bracket, 30, said bracket being secured to the rear face of the post or supporting-block 10. This bracket is formed with an elongated slot, 31, having an enlarged center, 32, and enlarged ends 33, as is clearly shown in Figs. 13 and 14, these enlargements being provided in order that the wires may pass each other in the center of the slot and may be allowed a sufficient amount of play at the ends thereof, the brackets serving to properly guide the wires and hold them in alignment.

Upon the rear face of the post 10 there are secured a number of spacing attachments or buffers, 34, said buffers consisting of T-shaped or broadly-headed bolts, the shanks of which are threaded and arranged to pass through properly-located apertures that are formed in the post 10, the shanks of the buffers or spacing attachments being provided with two binding-nuts, 35 and 36, the nut 35 being to the rear, while the nut 36 is in advance, of the post 10, the arrangement being such that the distance between the heads of the buffers and the post 10 may be regulated to suit the requirements of the operator, as will be readily appreciated by an inspection of Fig. 10.

In addition to the buffers or spacing attachments the blocks or posts 10 carry gages or supports 37, which consist of metallic strips bent to the form illustrated in Fig. 6, these strips being arranged for attachment to the bar, so that they will act as the step or support upon which the pickets are placed as they are introduced to place between the binding-wires; or if pickets of slightly unequal length are to be employed in the construction of the fence the strips 37 would act as top gages, being secured to the block or post 10, as indicated in Fig. 4, so that the tops of the pickets may be adjusted to the required line of height.

When the fence is gaged from the top, the pickets are supported by spring-clamps 38, the construction of which clamps is fully illustrated in Fig. 5, the clamps being made of a strip of metal that is first bent to U form and riveted or bolted to the post 10. Then the extending ends are bent inward and toward the post, so that when the picket is forced between said ends it will be firmly clamped and held to place.

The main handle of the machine is shown at 40, this handle being carried by a rearwardly-extending bar, 41, that is supported by a rod, 42, that passes through a hole near the end of the bar, the ends of the rod being secured to the post 10 at points near the top and bottom of said post.

The tension device employed in connection with the machine above described consists, essentially, of a casting, 50, that is formed with tapering projections 51 and 52, four of the projections 51 being preferably made upon the casting, while but two of the projections 52 are employed. Each pair of wires is provided with one of these tension attachments, the several tension attachments being secured to a supporting-board, 55, by means of bolts 56, the bolts passing through the castings and through the board 55, the ends of the bolts being engaged by nuts 57, so that the castings may be adjusted toward or from the board 55, as may be required in the building of the fence.

A rope, 58, is connected to the supporting-board 55 by means of metallic strips 59, that are riveted or bolted to the board, and this rope carries a swivel, 60, that is arranged for connection with any fixed object, such as the post shown at 61.

Such being the general construction of the machine, the operation is as follows: The wires by means of which the pickets are to be bound to place and supported are secured by staples or in any manner desired to a starting-post, as 63, having been previously passed through the apertures 14 and 15 of the twisters 11. The wires are then brought into engagement with the tension devices, each pair of wires being arranged as clearly illustrated in Fig. 16, the wires being inserted by turning off the nut 57 and withdrawing the casting 50 to about the position in which it is shown in Fig. 17, after which the wires may be slipped in between the ends of the tapering projections 51 and the supporting-board 55, so that the upper wire—for instance, the one shown at 64—will pass over the first projection 52, under the first of the upper projections, 51, over the bolt 56, under the second one of the upper projections, 51, and over the other projection 52, while the lower wire, 65, will pass under the projections 52 and the bolt 56 and over the projections 51, when, by turning up the nut 57, the casting may be drawn to the required position, the board 55 being provided with properly-arranged apertures, within which the projections 51 and 52 fit. After the wires have been inserted, as has just been described, a stick or other proper implement is brought into engagement with the rope 58 just in advance of the swivel 60, when, by turning this stick, the rope may be twisted, and all slack that there may be in the wires will be taken up, while the tension upon the wires may be regulated by tightening or loosening the nuts 57, for it will be understood that as the castings 50 are drawn in toward their supporting-board, owing to the tapering form of the projections 51 and 52, the wires will be forced to take a tortuous course in passing the projections, so that the closer the castings are drawn the more strain will there be required to draw the wires through the tension attachments. When the wires and the parts have been adjusted, as described, a preliminary twist is given to the wires by grasping the handle 26 and turning the crank 23, which will carry the strip 19 upward or downward and partially rotate the twisters. Then a picket is placed in between the two strands of each cable, and the machine is grasped by its handles 40 and 20 and drawn back, so as to force the picket or slat into the bite of the wires, the picket at this time being supported by the step or gage 37 and held by the clamp 38—that is, if the pickets are of uniform length and are to be gaged from their lower ends—care being taken at this time that the bar 41 rests flat against the post 63—that is, that the arm is adjusted so as to be in a line parallel with that upon which the fence is to be built.

By thus extending the handle-bar 41 rearward so as to rest flat against a completed portion of the fence the machine may be steadied and held from turning and the twister-apertures will be held parallel with the several wires. If the handle were extended in any other direction, the whole strain while operating the machine would be on the hand of the operator, and even then the machine could not be held perfectly plumb; but in my construction the completed fence assists in steadying the machine.

When the machine has been so adjusted, the crank 23 is turned in a reverse direction, and a second twist is imparted to the wire, this second twist being in advance of the slat or picket. The second twist having been made, the machine is moved forward and another picket is inserted between the strands of each cable, being supported as before, the machine is again moved back, and the operation is repeated, except that the lever 23 is moved in a direction the reverse of that last named; and so the operation is continued indefinitely, or until the fence is completed.

In order that the wires between the tension attachments and the main portion of the machine may be properly supported, I provide a light strip, 70, (see Figs. 1 and 9,) that is formed with a number of apertures, 71, slits or slots 72 leading from one edge of the strip to the apertures, in order to provide for the introduction of the wires. This supporting-strip is arranged as shown in Fig. 1, and serves to properly support and space several strands of wire.

Having thus fully described my invention, I claim as new and desire to secure by Letters Patent—

1. A tension device comprising a plate having tapering projections on one face and a support recessed or apertured to receive said projections, substantially as set forth.

2. In a tension device, the combination, with a casting formed with tapering projections, of a tightening-bolt and a supporting-board apertured or recessed to receive said projections, substantially as described.

3. As a new article of manufacture, the casting having a bolt aperture or recess through it, and upper, lower, and intermediate tapering projections on one face thereof, the upper and lower projections being of less length than the intermediate projections, substantially as set forth.

4. The combination, with a support or board having apertures therein, of the tension or stretching device adjustably secured to said board, and having upper and lower and intermediate tapering projections registering with said apertures, the intermediate projections being the longer, substantially as set forth.

5. A primary tension or stretching attachment for wire-fence-building machines, consisting of a rope arranged for connection with the tension-support, a swivel carried by the rope and arranged for attachment to a fixed support, and a twisting-lever, substantially as described.

6. In a fence-building machine, the combination, with a twister having the wire-receiving apertures, of a transverse bracket extending across the rear face of the twister between its apertures, and having a centrally-enlarged slot therein at right angles to a line drawn through the wire-receiving apertures, substantially as set forth.

7. In a fence-building machine, a twister comprising the forward flanged section having a bolt-aperture, wire-receiving apertures, and two lugs on its inner face, and the rear flanged section having slots receiving the said lugs, and also registering with the wire-apertures, a connecting-bolt, and the bracket extending across the rear face of the rear section, and having a slot enlarged at its center and ends, the slot being at right angles to the said slots, substantially as set forth.

8. The combination, with a post, its twisters, and the operating mechanism therefor, of a handle-bar projecting rearward from the post, and constructed to rest against the palings or slats of a completed portion of a fence, substantially as set forth.

9. In a wire-fence-building machine, the combination, with a main post and its rearwardly-extending handle-carrying arm, of twisters carried by the post, a twister-operating mechanism, buffer or spacing attachments 34, a picket gage or support, 37, tension attachments 50, carried by a board, 55, a rope, 58, connected to the board 55 and carrying a swivel, 60, and a twisting-lever, substantially as described.

10. In a wire-fence-building machine, the combination, with a main post, of twisters formed with lugs 17, carried by said main post, arms 18, pivotally connected to the lugs 17 of the twisters, a strip, 19, to which the opposite ends of the arms 18 are connected, an arm extending to the rear from the strip 19, bracing-rods arranged in connection therewith, and a crank carried by said arm and fulcrumed upon a support that is rigidly connected to the post 10, all substantially as described.

11. In a wire-fence-building machine, the combination, with a main post, of twisters carried thereby, a twister-operating mechanism, and brackets 30, arranged in connection with the twisters, said brackets being formed with elongated slots having central enlargements, 32, and end enlargements, 33, substantially as described.

W. H. HARRY FAUBER.

Witnesses:
MILES HENRY BUTLER,
DAVID FAUBER.